(12) United States Patent
McVeigh et al.

(10) Patent No.: US 7,170,936 B2
(45) Date of Patent: Jan. 30, 2007

(54) TRANSCODING APPARATUS, SYSTEM, AND METHOD

(75) Inventors: Jeffrey S. McVeigh, Portland, OR (US); Kenneth M. Salzberg, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 10/112,087

(22) Filed: Mar. 28, 2002

(65) Prior Publication Data

US 2003/0185542 A1  Oct. 2, 2003

(51) Int. Cl.
*H04N 7/12* (2006.01)
*H04B 1/66* (2006.01)

(52) U.S. Cl. .................................. 375/240.01
(58) Field of Classification Search ........... 375/240.01, 375/240.03, 240.1, 240.22; 348/390.1, 410.1; 382/232, 234, 251; H04N 7/12
See application file for complete search history.

(56) References Cited

U.S. PATENT DOCUMENTS

| | | | | |
|---|---|---|---|---|
| 4,918,523 A * | 4/1990 | Simon et al. | ........... | 375/240.23 |
| 5,122,873 A * | 6/1992 | Golin | ........... | 375/240.23 |
| 5,229,862 A * | 7/1993 | Takahashi et al. | ........... | 386/109 |
| 5,526,131 A | 6/1996 | Strolle et al. | ........... | 386/112 |
| 5,805,228 A * | 9/1998 | Proctor et al. | ........... | 375/240.22 |
| 5,862,140 A * | 1/1999 | Shen et al. | ........... | 370/468 |
| 5,877,812 A * | 3/1999 | Krause et al. | ........... | 375/240.25 |
| 5,926,223 A * | 7/1999 | Hardiman | ........... | 375/240.03 |
| 5,953,506 A * | 9/1999 | Kalra et al. | ........... | 709/231 |
| 6,055,023 A | 4/2000 | Rumreich et al. | ........... | 348/553 |
| 6,091,778 A | 7/2000 | Sporer et al. | ........... | 375/240 |
| 6,108,515 A * | 8/2000 | Freeman | ........... | 434/321 |
| 6,184,651 B1 * | 2/2001 | Fernandez et al. | ........... | 320/108 |

(Continued)

FOREIGN PATENT DOCUMENTS

EP        0915622        5/1999

(Continued)

OTHER PUBLICATIONS

Okubo, S. , "Requirements for High Quality Video Coding Standards"*Signal Processing: Image Communication*, 4(2), Elsevier Science Publishers, Amsterdam, (Apr. 1, 1992), 141-151.

*Primary Examiner*—Nhon Diep
(74) *Attorney, Agent, or Firm*—Schwegman, Lundberg, Woessner & Kluth, P.A.

(57) ABSTRACT

Various apparatus, systems, and articles including a machine-accessible medium, along with methods of processing and transferring audio-video content, are disclosed. The apparatus may include a resampler to receive and transform an original data stream into a sampled data stream; a first encoder to produce a first playback data stream by encoding the sampled data stream; and a second encoder to produce a second playback data stream by encoding the original data stream. Alternatively, the apparatus may include an encoder to receive and encode the original data stream into a second playback data stream; a memory to store the second playback data stream; a decoder to provide a final playback data stream by receiving and decoding the second playback data stream; and a resampler to receive and transform the final playback data stream into a sampled data stream, which the encoder receives and encodes into a first playback data stream.

22 Claims, 5 Drawing Sheets

U.S. PATENT DOCUMENTS

| | | | |
|---|---|---|---|
| 6,532,593 B1 * | 3/2003 | Moroney | 725/142 |
| 6,533,168 B1 * | 3/2003 | Ching | 235/375 |
| 6,590,936 B1 * | 7/2003 | Kadono | 375/240.12 |
| 6,765,966 B2 * | 7/2004 | Vince | 375/240.26 |
| 2002/0015576 A1 | 2/2002 | Gordon et al. | 386/68 |
| 2003/0028659 A1 * | 2/2003 | Mesarina et al. | 709/231 |

FOREIGN PATENT DOCUMENTS

| | | |
|---|---|---|
| EP | 1152613 | 11/2001 |
| WO | WO-97/01934 | 1/1997 |
| WO | WO-01/69936 | 9/2001 |

* cited by examiner

TRANSCODING APPARATUS, SYSTEM, AND METHOD

FIELD OF THE INVENTION

The present invention relates generally to apparatus, systems, and methods used for processing data and transferring data from one apparatus to another. More particularly, the present invention relates to processing and transferring digital content data, such as digital audio-video data, from one storage/playback system to another, using different storage and/or playback formats.

BACKGROUND INFORMATION

The video cassette recorder (VCR), which allows time-shifted viewing of audio-video content using a magnetically-recorded analog cassette, has become a fixture in the majority of American households. However, as consumers search for greater convenience, fidelity, and reliability, other forms of media are becoming more prominent. These include the digital video disk (DVD), and more recently, the personal video recorder (PVR).

Similar to the VCR, the PVR enables time-shifted playback of recorded television and other audio-video content. However, instead of using a linearly-accessible magnetic tape, the PVR digitizes and records content using randomly-accessible memory (e.g., hard disk drives). The end result is an improved playback experience; live content can be paused, commercials can be skipped, and repeated recording does nothing to degrade the quality of the recorded content.

While the benefits of the PVR are substantial, currently available playback devices do not provide the capability to extract playback content for use with portable data processing devices (e.g., personal entertainment devices, or PEDs) having limited storage and processing capability. Thus, viewing PVR content is limited to locations where a PVR can be situated, and eliminated everywhere else, reducing the potential viewing audience, and possibly, licensing revenue.

Therefore, there is a need in the art for an apparatus, an article including a machine-accessible medium, a system, and a method of conveniently processing and transferring audio-video content from a PVR to various portable data processing apparatus, such as PEDs, which have limited memory and processing capability. The ability to easily process and transfer audio-video content to PEDs and other portable devices will enable consumers to enjoy recorded television "anytime and anywhere." Providing this ability may broaden the audience for various content formats and serve as an additional source of licensing revenue for content providers.

DESCRIPTION OF THE PREFERRED EMBODIMENTS

Figure 1:
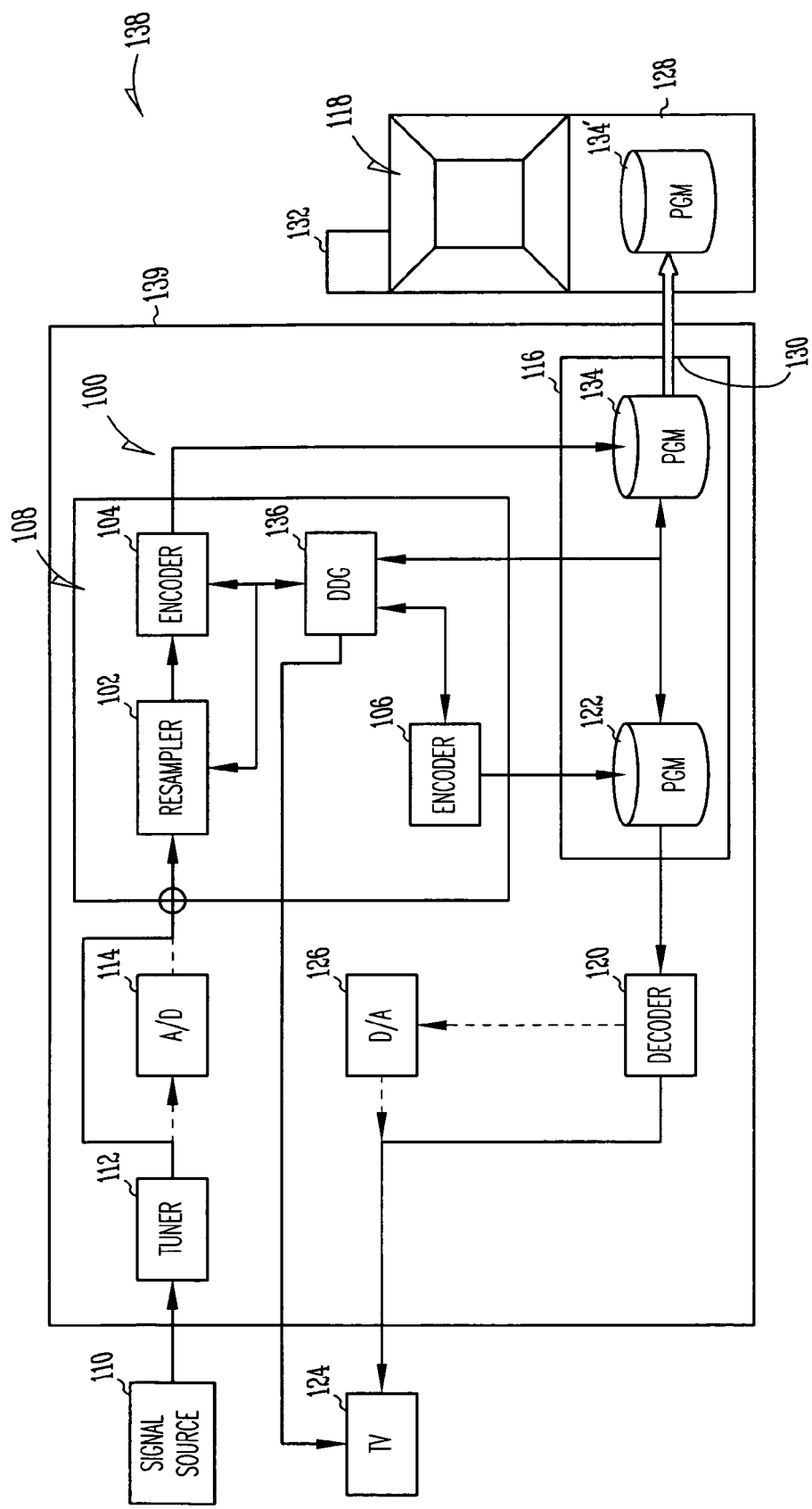
FIG. 1 is a block diagram of an apparatus, an article including a machine-accessible medium, and a system according to various embodiments of the present invention.

In the following detailed description of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the invention. Other embodiments may be utilized and derived therefrom, such that structural and logical substitutions and changes may be made without departing from the scope of the invention. The following detailed description, therefore, is not to be taken in a limiting sense, and the scope of the invention is defined only by the appended claims, along with the full range of equivalents to which such claims are entitled.

FIG. 1 is a block diagram of an apparatus, an article including a machine-accessible medium, and a system according to various embodiments of the present invention. In one embodiment of the invention, an apparatus 100 for processing and transferring audio-video content or data may include a resampler 102, a first encoder 104, and a second encoder 106. The apparatus 100 may be included as part of a consumer appliance 108, such as a personal computer, or a PVR, for example.

To use the apparatus, a consumer may select a program to be recorded from an analog or digital signal source 110, such as a cable network, a television antenna, or a server. At the appropriate time, when recording is scheduled to begin, a particular channel may be tuned or selected from the signal source, using a tuning device 112. For example, a signal may be tuned or selected from several available, and if not already in digital form (e.g., a National Television Signal Corporation (NTSC) video signal, an Advanced Television Systems Committee (ATSC) signal, or a Phase Alternation by Line (PAL) signal), the selected signal may be digitized or transformed into a digital signal (i.e., the original data stream) by a digital data source 114, such as a digital-to-analog converter. The relevant standards for the exemplary signals are as follows: Society of Motion Picture and Television Engineers, "Television—Composite Analog Video Signal—NTSC for Studio Applications", SMPTE-170M, 1994; ATSC Standard: Digital Television Standard, Revision B, Doc. A/53B, Aug. 7, 2001, found at http://www.atsc.org/standards/a_53b.pdf; and European Broadcasting Union Technical Document: tech 3280 1995, Specification of interfaces for 625-line digital PAL signals.

According to the conventional PVR recording process, the audio and video content included in the original data stream may be transmitted to and encoded by the second encoder 106 into any format, such as the Moving Picture Experts Group (MPEG)-2 format (see Generic Coding of Moving Pictures and Associated Audio Information, MPEG-2 International Standard, ISO/IEC JTC1/SC29/WG11, November 1994 and later versions, at http://mpeg.telecomitalialab.com/standards/mpeg-2/mpeg-2.htm), for example. The original data stream may thus be formatted into elementary data streams using dedicated compression ASICs or other devices and then multiplexed into one or more MPEG-2 program streams, which in turn may form a second playback data stream that is stored in a memory 116.

Due to the limited storage capacity and processing power of most portable audio-video playback devices, such as the data processing apparatus 118, playback of MPEG-2 program streams is not possible. Thus, some other mechanism for portable viewing of the reconstructed original data stream is required. In the embodiment shown in FIG. 1, the digital data source 114 may transmit the original data stream to the resampler 102. The original data stream may then be received and transformed into a sampled data stream by the resampler 102. This may occur by sampling the original data stream to provide a more appropriate resolution (e.g., 320× 240 pixel resolution) for a hand-held device, and then encoding the resampled audio and video to a more appropriate hand-held device bit rate. The first encoder 104, in turn, may receive and encode the original data stream to produce a first playback data stream, which may be in any format, such as the MPEG-4 format (see Coding of Moving Pictures and Audio, MPEG-4 International Standard, ISO/IEC JTC1/SC29/WG11, October, 1998 and later versions, at http://mpeg.telecomitalialab.com/standards/mpeg-4/mpeg-4.htm). The first playback data stream may optionally be stored in the memory 116.

If desired, the first playback data stream and the second playback data stream may be stored separately in the memory 116, which may comprise a portion of the consumer appliance 108 file system. Alternatively, the first and second playback data streams may be multiplexed together into a single data stream and stored in the memory 116 (e.g. the first playback data stream can be inserted into the "user data" segment of the second playback data stream, which may be an MPEG-2 program stream).

To play back the encoded data streams, the data may be taken from storage in the memory 116 and processed further. Typically, the consumer will select a previously-recorded program for playback through the consumer appliance 108. The copy, stored in the memory 116 as the second playback data stream, may be accessed and received by the decoder 120, which may be an MPEG-2 format decoder, for example. Various executable programs 122 may be used to assist with presenting the second playback data stream to the decoder 120, which provides a final playback data stream that can be sent directly to a television 124, such as a digital television. Alternatively, the final playback data stream may be sent to a digital data receiver 126, such as a digital-to-analog converter, capable of receiving and transforming the final playback signal into a signal (e.g., an NTSC, ATSC, or PAL television signal) to be received by the television 124.

If the consumer desires to play back the encoded data on the portable device 118, it must be transferred to the device 118 from the consumer appliance 108. The transfer operation moves the first playback data stream from the memory 116 to the memory 128 of the device 118. A wired or wireless connection 130, such as a universal serial bus, Bluetooth™ link, Infra-red Data Association (IrDA) link, Ethernet (IEEE 802.3) connection, or IEEE 802.11 connection may be used to effect the transfer of data from the memory 116 to the memory 128 (see the related standards: Universal Serial Bus 2.0 and later versions at www.usb.org; Bluetooth System Specification, Bluetooth Special Interest Group, Ver. 1.1 and later versions, March 2001; Infrared Data Association Minimal IrDA Protocol Implementation, Counterpoint Systems Foundry, Inc., Ver. 1.0 and later versions, Nov. 6, 1996; and IEEE Standards for Information Technology—Telecommunications and Information Exchange between Systems—Local and Metropolitan Area Network—Specific Requirements—Part 3: Carrier Sense Multiple Access with Collision Detection (CSMA/CD) Access Method and Physical Layer, IEEE 802.3-2002®, 2002, and Part 11: Wireless LAN Medium Access Control (MAC) and Physical Layer (PHY), ISO/IEC 8802-11: 1999). Of course, it is also possible to transfer the first playback data stream from the memory 116 to a removable storage medium 132 (e.g., a flash memory, compact disk, or other medium), which can be coupled to the portable device 118.

In addition to the audio-video data contained in the first playback data stream, meta-data associated with the data stream (e.g., title, air-time, duration) may also be transferred to improve the playback experience. Optionally, executable files 134, 134' such as software program modules (e.g. decoders) required to play back the content on the device 118 may also be transferred to the memory 128 or the removable media 132. By including the executable files 134, 134' with the first playback data stream, proper playback on the device 128 is ensured. For example, new and improved compression formats can be used to produce the first playback data stream without requiring a consumer to explicitly install new software on the device 118. Linking the content to the executable files can also provide a mechanism for managing the rights to the recorded audio-video content, and tracking usage of the content with respect to licensing royalty payments.

A data display generator 136 may be used to generate various displays on the television 124 or at other locations to inform the consumer about various aspects of audio-video content processing, transfer, and playback. For example, the generator 136 may be used to display conventional menus for selecting one or more channels of content using the selection device 112, such as a tuner. The generator 136 may also be used to provide a user interface display including data associated with the first and second playback data streams, as will be discussed in detail below.

Figure 2:
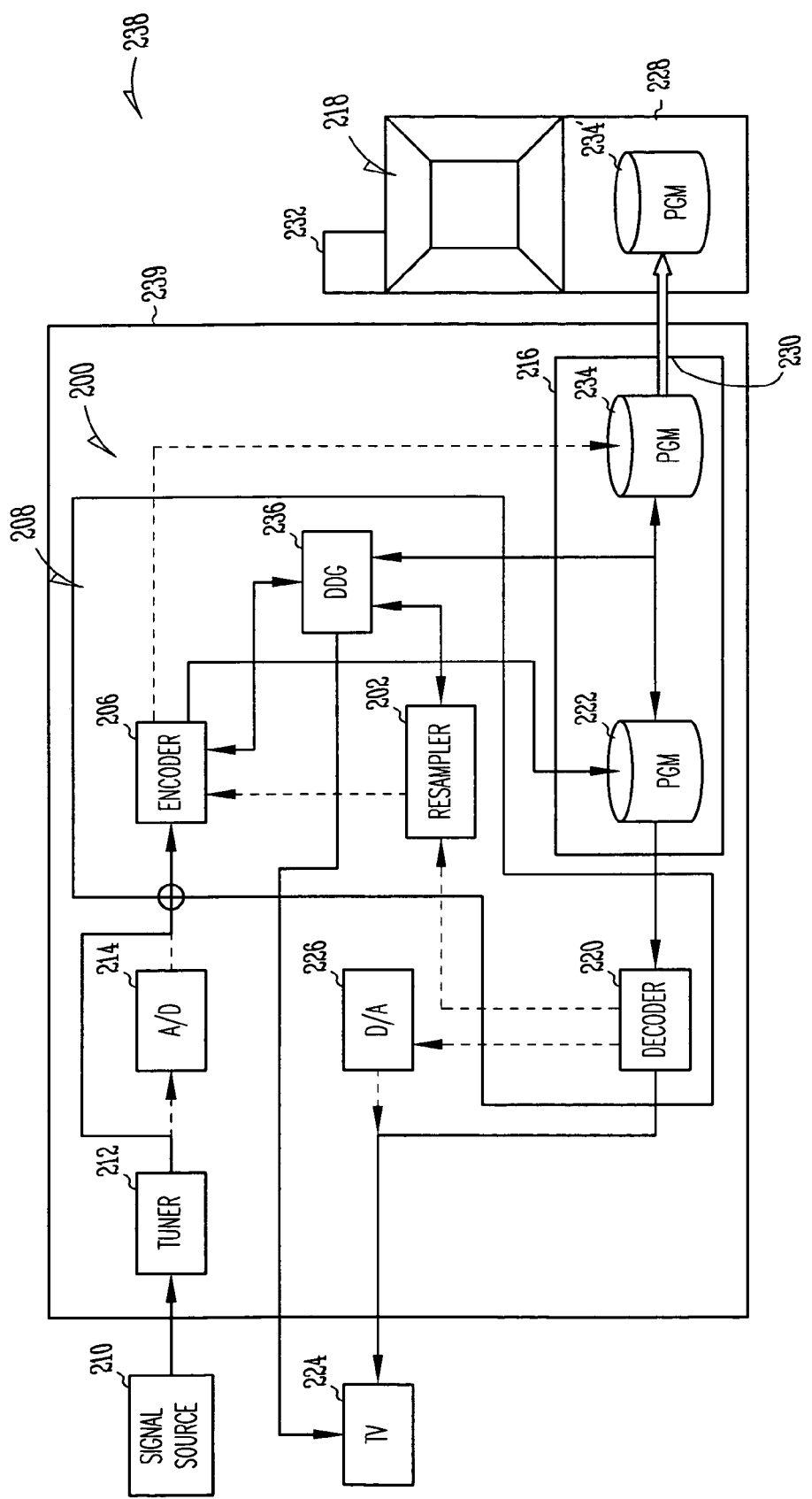
FIG. 2 is a block diagram of an alternative apparatus, an alternative article including a machine-accessible medium, and an alternative system according to various embodiments of the present invention.

FIG. 2 is a block diagram of an alternative apparatus, an alternative article including a machine-accessible medium, and an alternative system according to various embodiments of the present invention. In this embodiment, typically implemented to reduce cost by reusing hardware, an apparatus 200 may include an encoder 206 to receive and encode an original data stream into a second playback data stream. The apparatus 200 may also include a memory 216 capable of receiving and storing the second playback data stream, and a decoder 220, which receives and decodes the second playback data stream into a final playback data stream. The final playback data stream may be sent directly to a television 224, or in the alternative, to a digital data receiver 226, such as a digital-to-analog converter, to be received by the television 124. Executable programs 222 may be used to assist with presenting the second playback data stream to the decoder 220.

As noted previously, the apparatus 200 may be included as part of a consumer appliance 208. To use the apparatus 200, a consumer may select a program to be recorded from a signal source 210, such that a particular channel may be tuned or selected from the signal source, using the timing device 212. Once again, if not already in digital form, the selected signal may be digitized or transformed into a digital signal (i.e., the original data stream) by a digital data source 214. At this point, the audio and video content included in the original data stream may be transmitted to and encoded (if needed for the specific application) by the second encoder 206 into any format, such as the MPEG-2 format, to form a second playback data stream that is stored in a memory 216.

Since the limited capabilities of the data processing apparatus 218 (e.g., reduced storage capacity, low resolution, low frame rate, etc.) may prevent playback of MPEG-2 program streams, the apparatus 200 may also include a resampler 202. However, in this case, the resampler 202 is used to receive and transform the final playback data stream into a sampled data stream, such that the encoder 206 may be reused to receive and encode the sampled data stream into a first playback data stream. The encoder 206 may produce the first playback data stream in any format, such as the MPEG-4 format, and store the first playback stream in the memory 216.

As noted previously, the first and second playback data streams may be stored separately in the memory 216, or combined, if desired. To play back the encoded data streams, the data may be taken from storage in the memory 216 and processed as described above. Thus, if the consumer desires to play back the encoded data on the portable device 218, it must be transferred to the memory 228 of the device 218 from the appliance 208, or a removable storage medium 232, typically using a wired or wireless connection 230, such as a universal serial bus, Bluetooth™ link, Infra-red Data Association (IrDA) link, or 802.11 connection. Meta-data and executable files 234, 234' required to play back the content on the device 218 may also be transferred to the memory 228 or various types of removable storage media 232. A data display generator 236 may be used to generate various displays on the television 224, including a user interface displaying data associated with the first and second playback data streams.

In another embodiment, the invention includes a system 238 (see also the system 138 of FIG. 1) which comprises a first data processing apparatus 208 capable of being coupled to a second data processing apparatus 218, typically using a wired or wireless connection 230. According to various embodiments of the invention, the first data processing apparatus 208 may be a video recorder, such as a PVR, and the second data processing apparatus may be any number of devices, typically portable, such as a PED, a laptop computer, a palmtop computer, a personal digital assistant, a cellular telephone, a web tablet, and/or some form of dedicated audio-video playback device.

The first apparatus 208 may receive an original data stream including at least audio and visual information, and transform the original data stream into first and second playback data streams. Following the description of the apparatus 208, 218 above, in the system 238, the first apparatus 208 may transform the original data stream by resampling the original data stream to produce a first playback data stream, which may optionally be stored in the memory 216. This process may occur at about the same time as the first apparatus transforms the original data stream by encoding the original data stream into a second playback data stream, which may also be stored in the memory 216.

The systems 138, 238 of the present invention may include various combinations of a resampler, encoders, and decoders. For example, referring back to FIG. 1, it may be seen that in the system 138 the first data processing apparatus 108 may include a resampler 102 capable of receiving and transforming the original data stream into a sampled data stream, and a first encoder 104 coupled to the resampler. The encoder 104 may then encode the sampled data stream to produce the first playback data stream. The apparatus 108 may also include a second encoder 106 capable of receiving and encoding the original data stream into the second playback data stream.

It should be noted that the apparatus 100, 200; signal sources 110, 210; tuning devices or tuners 112, 212; digital data sources 114, 214; resamplers 102, 202; encoders 104, 106, 206; data display generators 136, 236; memories 116, 216; decoders 120, 220; digital data receivers 126, 226; and televisions 124, 224 may all be characterized as "modules" herein. Such modules may include hardware circuitry, such as a microprocessor and/or memory circuits, software program modules, and/or firmware, and combinations thereof, as desired by the architect of the apparatus 100, 200, appliances 108, 208, and systems 138, 238, and appropriate for particular implementations of the invention. Similarly, all of the modules may be grouped together into a single apparatus, distributed among several different devices, or arranged so that some modules are grouped together, and other are distributed separately, as desired.

One of ordinary skill in the art will understand that the apparatus and systems of the present invention can be used in applications other than for devices such as handheld or portable computers, and systems which include PVRs and PEDs, and thus, the invention is not to be so limited. The illustrations of apparatus 100, 200 and systems 138, 238 are intended to provide a general understanding of the structure of the present invention, and are not intended to serve as a complete description of all the elements and features of audio-video content processing apparatus and systems which might make use of the structures described herein.

Applications which may include the novel apparatus and systems of the present invention include electronic circuitry used in high-speed computers, communication and signal processing circuitry, modems, processor modules, embedded processors, and application-specific modules, including multilayer, multi-chip modules. Such apparatus and systems may further be included as subcomponents within a variety of electronic systems, such as televisions, cellular telephones, personal computers, entertainment centers, vehicles, and others.

Figure 3:
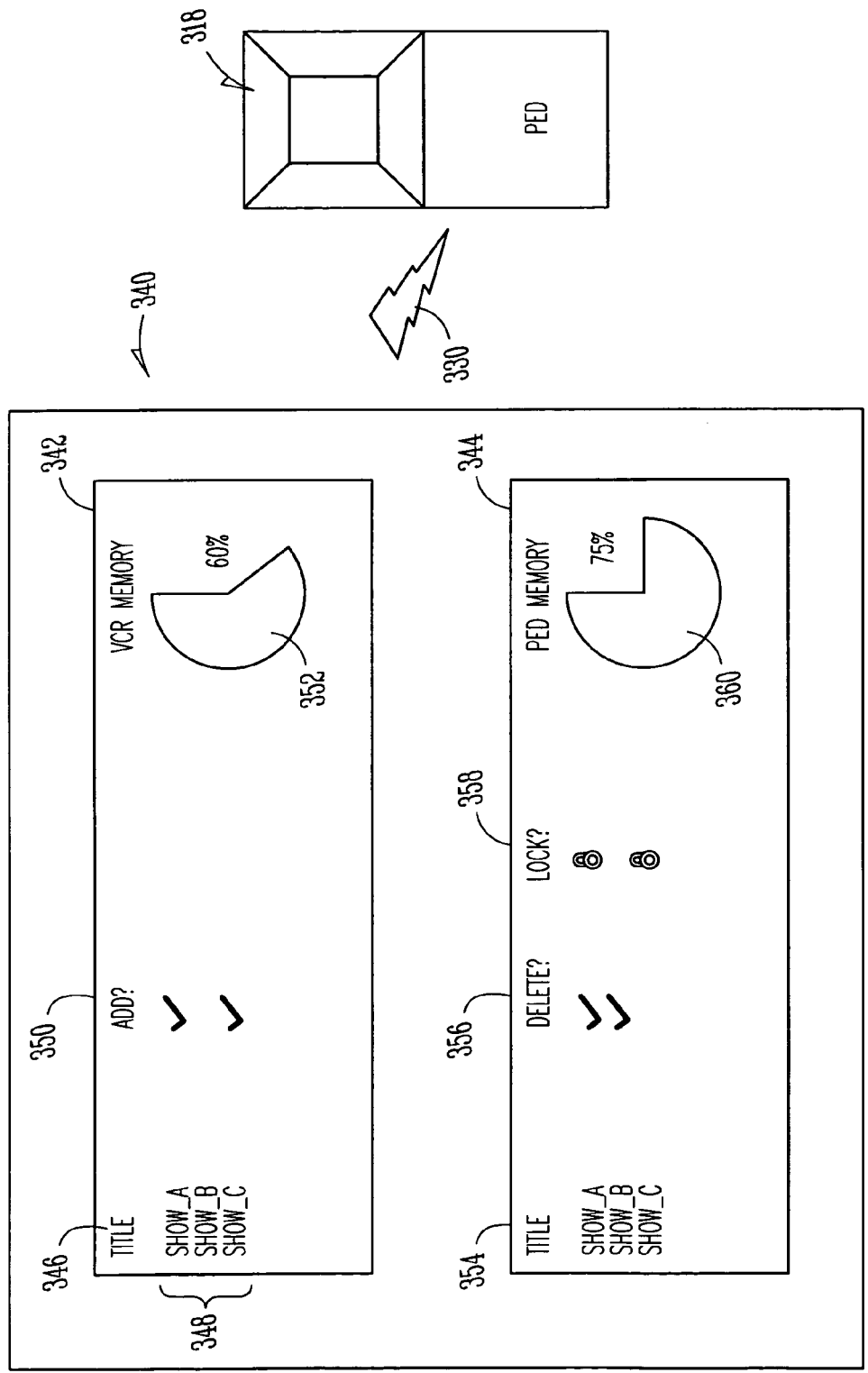
FIG. 3 is an exemplary user interface display according to an embodiment of the present invention.

Many possible configurations useful for presenting the operational status of the apparatus and systems of the invention to consumers are possible. As mentioned above, a display may be used to inform the consumer about the status of various aspects of the audio-video content processing, transfer, and playback process. For example, an exemplary user interface display including status data associated with the first and second playback data streams is shown in FIG. 3. In this case, the display 340 is shown as being divided into two areas: an appliance status area 342 and a portable device status area 344. While the status areas 342, 344 share some characteristics, they are also quite distinct from each other.

The appliance status area 342 may contain various subject headings, such as available content titles 346, including individual shows 348, performances, or episodes, for example. The appliance status area 342 may also include indications 350 as to whether the individual shows 350 are to be added to the memory of the portable device 318 (e.g., in the figure, SHOW_A and SHOW_C are to be transferred or copied to the portable device 318 via the connection 330). An indication of available appliance memory 352 may also be included in the appliance status area 342.

Similarly, the portable device status area 344 may contain various subject headings, such as transferred or copied content titles 354, and indications 356 of whether individual shows have been selected for deletion from the memory of the portable device 318 (e.g., in the figure, SHOW_A and SHOW_B are to be deleted). Indications 358 of whether individual shows are protected from deletion, or locked, may also be present as part of the portable device status area 344, as may an indication of available portable device memory 360.

Figure 4:
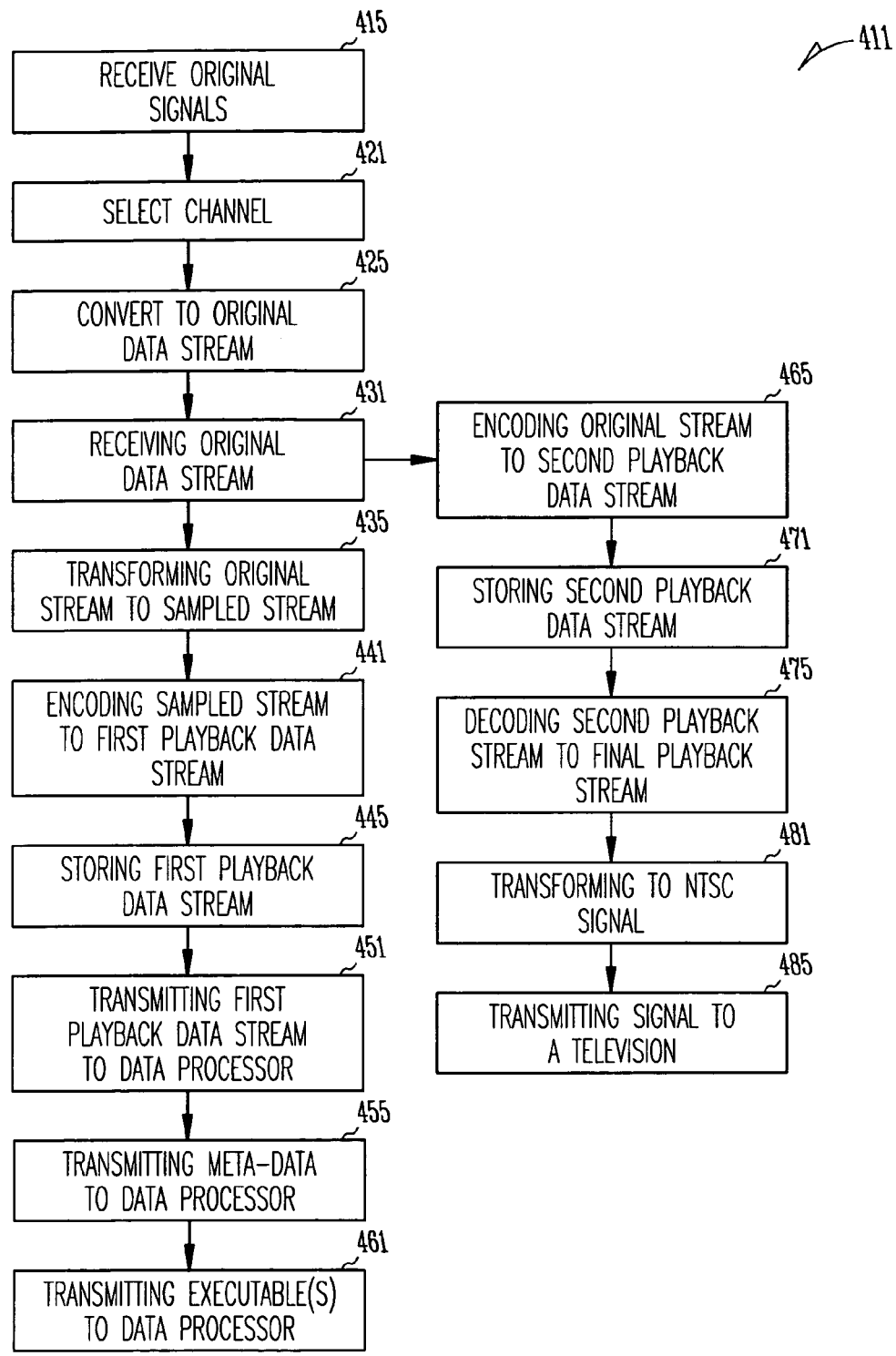
FIG. 4 is flow chart illustrating a method of processing and transferring content according to an embodiment of the present invention.

As discussed above, several apparatus and systems may embody the invention. There are also several methods which may be practiced as part of the invention. For example, FIG. 4 is a flow chart illustrating one possible method of processing and transferring content according to an embodiment of the present invention. The method 411 may include receiving original signals at block 415, such as analog television signals (e.g., NTSC, ATSC, or PAL format television signals) or digital audio-video signals, from any number of signals sources (e.g. a television station, a network, a server, or a memory). If several channels of data or content are present, the method 411 may include selecting a particular channel, or tuning to the channel of interest as presented by the signal source at block 421. If the source is an analog source, or packetized digital data, the method 411 may include converting the selected original signal into an original data stream at block 425, suitable for reception by various commonly available decoders. Thus, if the signal supplied by the signal source is an analog signal, such as an NTSC, ATSC, or PAL signal, conversion may include analog-to-digital signal conversion, as is well known to those skilled in the art. However, if the signal source supplies a digital signal, such as a packetized signal, conversion may include arranging the packets into a suitable order for processing by an encoder, such as an MPEG-2 encoder.

The method 411 may include receiving the original data stream at block 431, perhaps at an external connector present on a PVR or some other consumer appliance, at which point two separate processes may occur at approximately the same time, or at least, in a semi-overlapping fashion. Each process involves the creation of a playback data stream: the first playback data stream is typically used in the operation of a PED, and the second playback data stream is typically used in the operation of a non-portable consumer appliance, such as a PVR.

The method 411 may include transforming the original data stream into a sampled data stream (e.g., using a resampler) at block 435, encoding the sampled data stream to produce a first playback data stream (e.g. using an MPEG-4 encoder) at block 441, and storing the first playback data stream at block 445, usually in a memory included in the consumer appliance which receives the original data stream.

Prior to viewing by the consumer, the method 411 may continue at block 451 with transmitting the first playback data stream to a data processing apparatus, such as a laptop computer, a palmtop computer, a personal digital assistant, a cellular telephone, a PED, a web tablet, or some other form of a dedicated audio-video playback device. As described previously with respect to the apparatus of the invention, the method 411 may include transmitting meta-data and/or executable programs associated with the first playback data stream to the data processing apparatus.

To create the second playback data stream after the original data stream is received at block 431, the method 411 may include encoding the original data stream into a second playback data stream (e.g., using an MPEG-2 encoder) at block 465. The second playback data stream may then be stored at block 471, usually in the appliance memory.

In order to be viewed by a consumer, the method 411 may include decoding the second playback data stream into a final playback data stream at block 475, and transmitting the final playback data stream to a television at block 485 (e.g. assuming a digital television receiver). Alternatively, the method 411 may include decoding the second playback data stream into a final playback data stream at block 475, transforming, perhaps via digital to analog conversion, the final playback data stream into a television signal (e.g. NTSC, ATSC, or PAL) at block 481, and transmitting the television signal to a television at block 485. Of course, other analog signal formats may be used in lieu of NTSC, ATSC, or PAL-specified formats.

Figure 5:
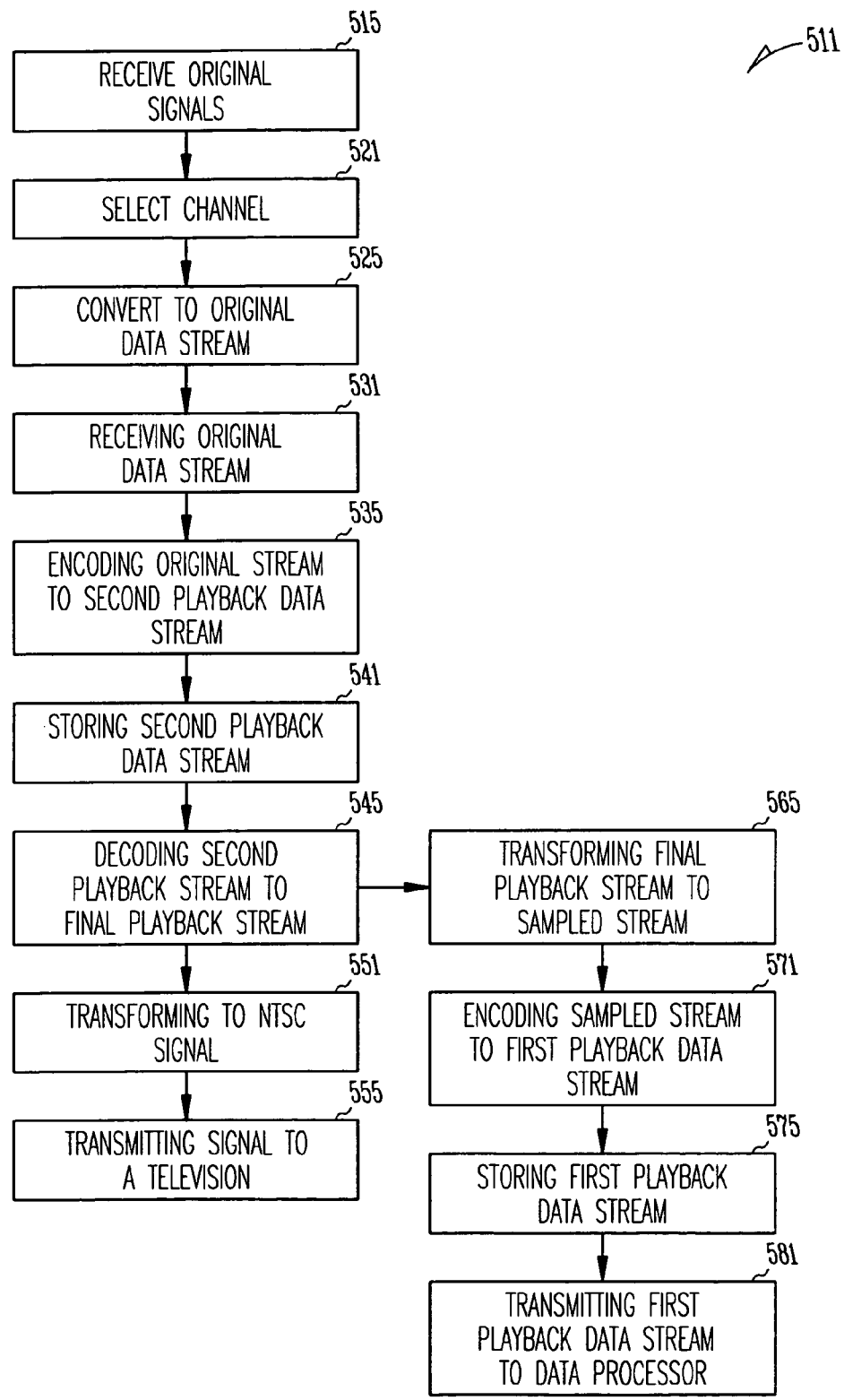
FIG. 5 is flow chart illustrating an alternative method of processing and transferring content according to an embodiment of the present invention.

FIG. 5 is flow chart illustrating an alternative method of processing and transferring content according to an embodiment of the present invention. In this case, the method is characterized by creating the playback data streams in a serial fashion, rather than a semi-simultaneous or overlapping fashion. Thus, the method 511 may include receiving original signals at block 515, selecting a particular channel at block 521, converting the selected original signal into an original data stream at block 525, and receiving the original data stream at block 531. Up to this point, the method shown in FIG. 5 is similar to that shown in FIG. 4. However, at this point, the two embodiments diverge.

To create the second playback data stream after the original data stream is received at block 531, the method 511 may include encoding the original data stream into a second playback data stream (e.g., using an MPEG-2 encoder) at block 535, and storing the second playback data stream, usually in the appliance memory, at block 541. In order to be viewed by the consumer, the method 511 may include decoding the second playback data stream into a final playback data stream at block 545, and transmitting the final playback data stream to a television at block 555 (e.g., using a digital television receiver). Alternatively, the method 511 may include decoding the second playback data stream into a final playback data stream at block 545, transforming, using digital to analog conversion, the final playback data stream into a television signal (e.g. NTSC, ATSC, or PAL) at block 551, and transmitting the television signal to a television at block 555. As noted above, other signal formats than NTSC, ATSC, or PAL may be used.

As the second playback stream is decoded to provide a final playback data stream at block 545, the method 511 may include transforming the original data stream into a sampled data stream (e.g., using a resampler) at block 565, encoding the sampled data stream to produce a first playback data stream (e.g. using an MPEG-2 or MPEG-4 encoder, which may be the same encoder used at block 535) at block 571, and storing the first playback data stream at block 575, usually in a memory included in a consumer appliance used to view the second playback data stream. Thus, implementing the method 511 typically results in storing the second playback data stream before decoding the second playback data stream to provide a final playback data stream, which is then transformed into a sampled data stream.

Prior to viewing by the consumer, the method 511 may continue at block 581 with transmitting the first playback data stream to any number of portable data processing apparatus, including laptop computers, palmtop computers, personal digital assistants, cellular telephones, PEDs, web tablets, or dedicated audio-video playback devices. As described previously with respect to the apparatus of the invention, the method 511 may include transmitting meta-data and/or executable programs associated with the first playback data stream to the portable data processing apparatus.

Referring back to FIGS. 1 and 2, it is now easily understood that another embodiment of the invention may include an article 139, 239, such as a computer, a memory system, a magnetic or optical disk, some other storage device, and/or any type of electronic device or system, comprising a machine-accessible medium 116, 216 (e.g., a memory including an electrical, optical, or electromagnetic conductor) having associated data 134, 234 (e.g. computer program instructions), which when accessed, results in a machine performing such actions as receiving an original data stream, transforming the original data stream into a sampled data stream, and encoding the sampled data stream to produce a first playback data stream, which may then be stored and/or transmitted to a portable data processing apparatus for viewing. Of course, the actions may also include transmitting meta-data and executable programs associated with the first playback data stream to the data processing apparatus.

The machine accessible medium may also include data which causes the machine to perform other actions, such as encoding the original data stream into a second playback data stream, decoding the second playback data stream to provide a final playback data stream, and transmitting the final playback data stream to a television.

The apparatus, systems, articles, and methods of the invention provide an efficient mechanism whereby audio-video content, received in either analog or digital form, is transformed into an original data stream that can be encoded, stored, and decoded for viewing using a (typically non-portable) consumer appliance, such as a PVR. More important, however, is that the invention provides the ability to conveniently transfer a playback data stream to various data processing apparatus, such as PEDs, in a useful form, which accommodates the limited memory and processing capability of such (typically portable) devices. Various embodiments of the invention may be practiced, and cost savings may be realized via reuse of component elements. Moreover, the ability to easily process and transfer audio-video content to PEDs and other portable devices will allow consumers to enjoy audio-video content, such as recorded television, wherever portable devices can be operated, increasing the potential size of viewing audiences and perhaps serving as an additional source of licensing revenue for content providers.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures and methods are used. The scope of the invention should be determined with reference to the appended claims, along with the full range of equivalents to which such claims are entitled.

What is claimed is:

1. An apparatus, comprising:
an encoder to receive and encode an original data stream into a second playback data stream;
a memory capable receiving and storing the second playback data stream;
a decoder to receive and decode the second playback data stream into a final playback data stream for playback to a viewer;
a resampler to receive and transform the final playback data stream into a sampled data stream, wherein the encoder is to receive and encode the sampled data stream into a first playback data stream; and
at least one of a disk drive internal to a portable electronic device and removable media inserted into the portable electronic device to replay the first playback data stream.

2. The apparatus of claim 1, further comprising:
a digital data receiver capable of receiving and transforming the final playback data stream into a signal to be received by a television.

3. The apparatus of claim 1, further comprising:
a data display generator to generate a user interface display including data associated with the first and second playback data streams.

4. A method, comprising:
receiving an original data stream;
encoding, using an encoder, the original data stream into a second playback data stream; decoding the second playback data stream to provide a final playback data stream;
transforming the final playback data stream into a sampled data stream;
encoding, using the encoder, the sampled data stream to produce a first playback data stream; and
storing the first playback data stream on at least one of a disk drive internal to a portable electronic device and removable media inserted into the portable electronic device to replay the first playback data stream.

5. The method of claim 4, further comprising:
storing the second playback data stream before transforming the final playback data stream into a sampled data stream.

6. The method of claim 4, further comprising:
storing the first playback data stream; and
transmitting the first playback data stream to a data processing apparatus selected from the group consisting of a laptop computer, a palmtop computer, a personal digital assistant, a cellular telephone, a web tablet, and a dedicated audio-video playback device.

7. An apparatus, comprising:
an encoder to receive and encode an original data stream into a second playback data stream;
a decoder to receive the second playback data stream from a second memory and to decode the second playback data stream into a final playback data stream; and
a resampler to receive and sample the final playback data stream to provide a sampled data stream, wherein the encoder is to receive and encode the sampled data stream into a first playback data stream, and wherein the final playback data stream is for playback to a viewer.

8. The apparatus of claim 7, further comprising:
a digital data source to transmit the original data stream to the encoder.

9. The apparatus of claim 7, further comprising:
a first memory to store the first playback data stream.

10. The apparatus of claim 7, further comprising:
the second memory to store the second playback data stream.

11. The apparatus of claim 7, further comprising:
a digital data receiver to receive and transform the final playback data stream into a television signal.

12. The apparatus of claim 7, further comprising:
a data display generator to generate a user interface display including data associated with the first playback data stream.

13. A method, comprising:
encoding, using an encoder, an original data stream into a second playback data stream;
decoding the second playback data stream to provide a final playback data stream;
sampling the final playback data stream to provide a sampled data stream; and
encoding, using the encoder, the sampled data stream to provide a first playback data stream to be played back by a portable electronic data processing device.

14. The method of claim 13, further comprising:
storing the first and second playback data streams.

15. The method of claim 13, further comprising:
transmitting the first playback data stream to a data processing apparatus selected from a group consisting of a laptop computer, a palmtop computer, a personal digital assistant, a cellular telephone, a web tablet, or a dedicated audio-video playback device.

16. The method of claim 13, further comprising:
transmitting the final playback data stream to a television.

17. The method of claim 13, further comprising:
receiving an Advanced Television Systems Committee (ATSC) television signal; and
transforming the ATSC signal into the original data stream.

18. The method of claim 13, further comprising:
receiving a Phase Alternation by Line (PAL) television signal; and
transforming the PAL signal into the original data stream.

19. An article comprising a computer-readable medium having instructions stored thereon, wherein the instructions, when executed by a computer, result in the computer performing:
encoding, using an encoder, an original data stream into a second playback data stream;
decoding the second playback data stream to provide a final playback data stream;
sampling the final playback data stream to provide a sampled data stream; and
encoding, using the encoder, the sampled data stream to provide a first playback data stream to be played back by a portable electronic data processing device.

20. The article of claim 19, wherein the instructions, when executed by the computer, result in the computer performing:
transmitting the first playback data stream to a data processing apparatus; and
transmitting meta-data associated with the first playback data stream to the data processing apparatus.

21. The article of claim 19, wherein the instructions, when executed by the computer, result in the computer performing:
transmitting the first playback data stream to a data processing apparatus; and
transmitting an executable playback program associated with the first playback data stream to the data processing apparatus.

22. The article of claim 19, wherein the instructions, when executed by the computer, result in the computer performing:
transmitting the final playback data stream to a television.

* * * * *

UNITED STATES PATENT AND TRADEMARK OFFICE
CERTIFICATE OF CORRECTION

PATENT NO. : 7,170,936 B2  Page 1 of 1
APPLICATION NO. : 10/112087
DATED : January 30, 2007
INVENTOR(S) : McVeigh et al.

It is certified that error appears in the above-identified patent and that said Letters Patent is hereby corrected as shown below:

On Title Page, Item (56), under "Other Publications", line 2, delete "Standards"Signal" and insert -- Standards", Signal --, therefor.

In column 9, line 61, in Claim 1, after "capable" insert -- of --.

Signed and Sealed this

Seventeenth Day of April, 2007

JON W. DUDAS
*Director of the United States Patent and Trademark Office*